United States Patent [19]

Sharma et al.

[11] Patent Number: 4,573,402

[45] Date of Patent: Mar. 4, 1986

[54] CALIPER CONTROL SYSTEM AND METHOD

[76] Inventors: Rajeeva Sharma, 4627 Clarendon Dr., San Jose, Calif. 95129; C. Eric Kan, 1435 Bobwhite Pl., San Jose, Calif. 95131

[21] Appl. No.: 708,345

[22] Filed: Mar. 5, 1985

Related U.S. Application Data

[63] Continuation-in-part of Ser. No. 638,737, Aug. 8, 1984.

[51] Int. Cl.⁴ .......................... B30B 15/34; B30B 3/04
[52] U.S. Cl. ......................................... 100/38; 100/47; 100/93 RP; 100/168; 100/162 B; 29/116 AD; 219/10.61 R
[58] Field of Search .............. 100/38, 47, 93 RP, 917, 100/168, 162 B; 219/10.41, 10.43, 10.57, 10.61 R, 10.71, 10.73; 34/48, 54; 29/116 AD, 113 AD

[56] References Cited

U.S. PATENT DOCUMENTS

| | | | |
|---|---|---|---|
| 2,141,403 | 12/1938 | Offen | 34/54 |
| 3,085,347 | 4/1963 | Justus | 34/54 X |
| 3,190,212 | 6/1965 | Moore | 100/38 |
| 3,266,561 | 8/1966 | Beachler et al. | |
| 3,793,741 | 2/1974 | Smith, Jr. | 34/48 |
| 4,114,528 | 9/1978 | Walker | 100/47 |
| 4,218,830 | 8/1980 | Grassmann | 219/10.61 R |

*Primary Examiner*—Peter Feldman

[57] ABSTRACT

System and method for controlling the caliper of a web of material acted upon by one or more pressure rolls. The caliper is controlled by adjustment of the diameter of the roll, and the roll is locally heated and cooled by a combination of impingement, radiant and convective heat transfer.

17 Claims, 6 Drawing Figures

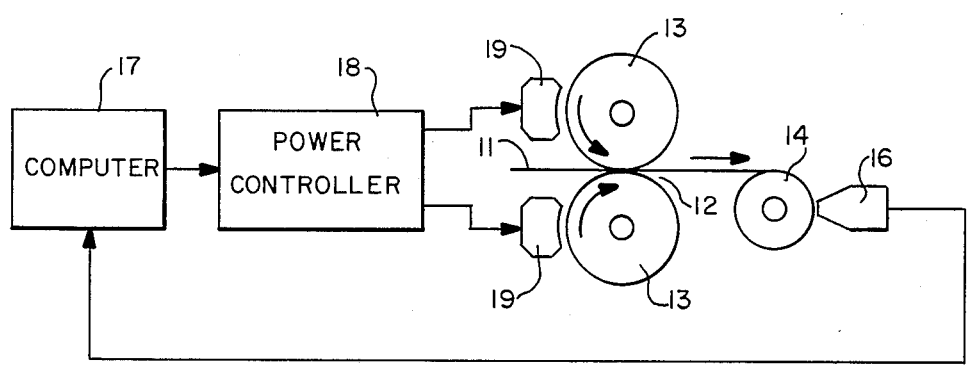
FIG.—1
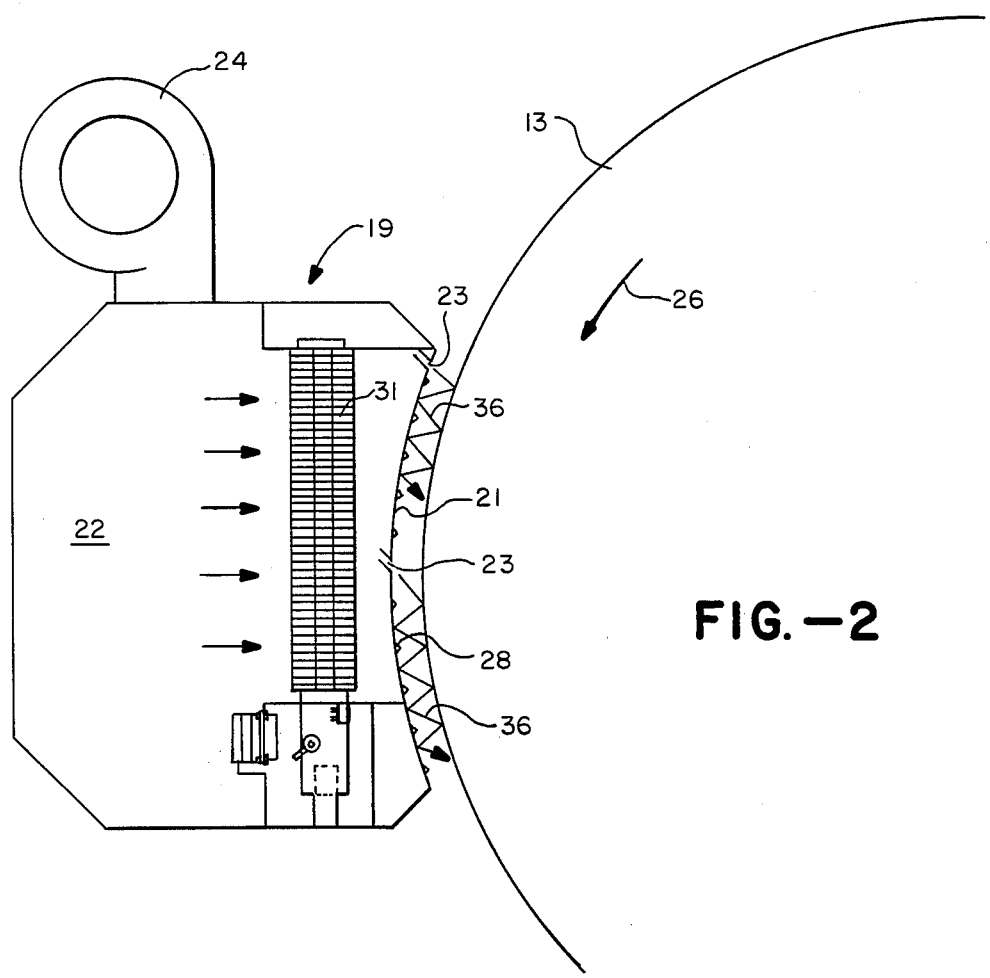
FIG.—2

CALIPER CONTROL SYSTEM AND METHOD

CROSS-REFERENCE TO RELATED APPLICATION

This application is a continuation-in-part of application Ser. No. 638,737, filed Aug. 8, 1984, in the name of RAJEEVA SHARMA, entitled "CALIPER CONTROL SYSTEM AND METHOD".

This invention pertains generally to the processing of paper, plastics and other materials with rotating pressure rolls, and more particularly to a system and method controlling the caliper or thickness of a web of material acted upon by one or more pressure rolls.

In the processing of sheet materials such as paper, plastics and fibrous materials, the character of the material can be changed by passing the material through a nip formed between cooperating pressing elements such as rotating pressure rolls. For example, passing a web of paper between calender rolls can change the caliper, density and surface characteristics of the paper. The uniformity of the compacting action is controlled by controlling the local diameter of the rolls and, thereby, the localized nip pressure. The rolls are typically fabricated of a material which expands and contracts with temperature, and the roll diameter is controlled by locally heating and/or cooling different portions of the rolls.

In recent years, sheet processing machines have been equipped with computer-based measurement systems which have permitted accurate measurement of sheet parameters such as basis weight, moisture and caliper, both in the machine direction (i.e. the direction of sheet travel) and in the cross direction. In the majority of cases, basis weight and moisture have been under closed loop control with respect to machine direction variations, but control of weight, moisture and caliper in the cross direction has been difficult. This difficulty has been due in part to a lack of effective and reliable actuators for controlling the localized heating of the pressure rolls.

In the manufacture of paper, caliper is of primary importance because of its effect on reel hardness and reel building. In addition to caliper variations, poor weight profile and moisture profile can cause problems in reel building. Regardless of the cause, however, the calender stack has traditionally been used to make adjustments to the cross direction caliper. These adjustments have been made by applying or removing heat at selected locations across the calender rolls to cause local variations in their diameter. Friction pads and heat lamps have been utilized to heat the rolls to produce local expansion, but the degree of control provided by these heating elements has been relatively crude. In addition, friction pads tend to wear the roll surfaces and thus defeat the purpose for which they are intended. Jets of hot or cold air have also been directed against local areas of the rolls to control the diameter. The hot air jets produce localized expansion of the rolls, and cool air jets produce localized contraction.

Because of the importance of reel building, closed loop control systems have been utilized to control the cross direction caliper. With air jet systems, automatic control has been achieved by utilizing solenoid operated valves to control the air jets. Operation of the valves is controlled by a computer in accordance with monitored properties of the processed paper. This system has certain limitations and disadvantages. The electromechanical interface is prone to failure and is unnecessarily complicated, and the air jets rarely have the range and resolution required to fully control the cross direction profile, even if separate hot and cold air systems are utilized.

U.S. Pat. No. 4,384,514 describes an induction heating system for heating localized portions of the rolls by electrical currents induced therein. This system provides a relatively rapid temperature increase, but cooling of the rolls is relatively slow unless some auxiliary cooling means, such as cold air jets, is employed.

It is in general an object of the invention to provide a new and improved caliper control system and method.

Another object of the invention is to provide a new and improved caliper control system of the above character which overcomes the limitations and disadvantages of the prior art.

These and other objects are achieved in accordance with the invention by locally heating and cooling the pressure rolls by a combination of convective, radiant and impingement heat transfer. A cylindrically curved faceplate is positioned in close facing proximity to the surface of the roll, and air is discharged through spaced apart openings into the region between the faceplate and the roll. The air flows continuously and is obtained from a single source at room temperature. Individually controlled heating elements permit the air passing through discharge openings to be heated to control localized heating and cooling of the roll.

FIG. 1 is a schematic illustration of a caliper control system according to the invention.

FIG. 2 is a cross-sectional view, somewhat schematic, of an actuator for heating and cooling one of the pressure rolls in the embodiment of FIG. 1.

Figure 3:
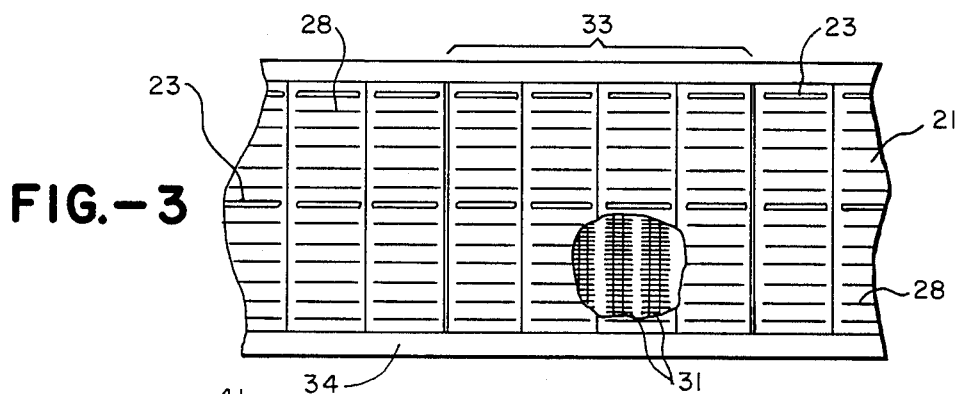
FIG. 3 is a fragmentary front elevational view, partly broken away, of the actuator of FIG. 2.

In the drawings, the invention is illustrated in connection with a caliper control system for a paper processing machine in which a web of paper 11 passes through a nip 12 formed between two calender rolls 13. After passing between the calender rolls, the paper is rolled to form a reel 14. Sensors 16 monitor the hardness and uniformity of the reel during the reel building process, and data representative of these parameters is applied to a computer 17. The computer and a power controller 18 control the operation of one or more actuators 19 to control the temperature and, hence, the diameter of calender rolls 13.

As illustrated in FIGS. 2 and 3, each of the actuators 19 comprises an axially elongated cylindrically curved faceplate 21 having a concave front surface which faces the outer surface of the calender roll associated therewith. The faceplate is positioned coaxially of the calender roll, with the front surface of the faceplate being spaced in close proximity (e.g. ½ inch) to the surface of the roll. The faceplate extends the entire length of the roll and has an arc length on the order of 25° or more, whereby an enclosed region of substantial area is formed between the faceplate and the roll.

Means is provided for continuously discharging air at high velocity (e.g. 8–10,000 ft/sec) into the region between the faceplate and the roll. This means includes a plenum chamber 22 positioned behind the faceplate and a plurality of discharge openings 23 in the faceplate. Pressurized room air is introduced into the plenum chamber by a blower 24 and forced out through openings 23. Each of the discharge openings comprises an elongated slotted opening having a length on the order of 3 inches and a width on the order of 0.030 inch. The openings are oriented with their long dimensions parallel to the axis of the roll. Even though the velocity of the air passing through openings 23 is relatively high, the volume of the air flow is relatively low (e.g. 75 cfm per cross direction foot of actuator), therefore, the electrical input required for each heating element 31 is low (e.g. 10 kw per cross direction foot of actuator). These heating elements are discussed more fully hereinafter. The pressure within the plenum chamber is on the order of 4 inches water gauge, and blower 24 can be of relatively small size, e.g. 1 hp per foot of actuator.

Discharge openings 23 are arranged in two circumferentially spaced, axially extending rows in the faceplate. One of these rows is positioned near the upper edge of the faceplate, and the other row is positioned centrally between the upper and lower edges. In the embodiment illustrated, the roll rotates in a counterclockwise direction, as indicated by arrow 26. If the roll rotated in the opposite direction, one of the rows of openings would be located near the lower edge of the faceplate, and the other would be centrally located.

Discharge openings 23 are oriented to discharge the air into the region between the faceplate and the roll with a component of velocity in the direction the surface of the roll travels in this region. In the embodiment illustrated, the surface of the roll travels in a downward direction, and the discharge openings are angled downward.

A plurality of baffle bars 28 project from the front face of faceplate 21. These bars comprise longitudinally extending ribs arranged in vertically extending rows aligned with discharge openings 23. As discussed more fully hereinafter, these bars or ribs serve to maintain the air between the faceplate and the roll in a turbulent condition, and they also enhance the radiant heat transfer from the front face of the faceplate.

Means is provided for selectively heating the air passing through openings 23 to produce localized heating or cooling of the calender roll. This means includes a plurality of individually controlled heating elements 31 mounted behind faceplate 21 toward the front of plenum chamber 22. The heating elements extend in a direction roughly perpendicular to the radius of the calendar roll and are positioned behind slots 23 to heat the air delivered to the slots. In the embodiment illustrated, the heating elements comprise electrical resistance heating elements with a plurality of fins through which the air flows as it moves toward the discharge openings. Two heating elements are provided for each discharge opening, and the two elements for each opening are mounted side by side and connected electrically in series.

In one presently preferred embodiment, actuator 19 is constructed in a modular form with a plurality of modular thermal units 33 mounted on a framework or housing 34 in which the plenum chamber is formed. Each of the thermal units includes a portion of the faceplate approximately 1 foot in length, with four discharge openings in each row and eight heating elements. With an 8 foot calender roll, for example, eight thermal modules are employed.

Operation and use of the caliper control system and, therein the method of the invention, can now be described. Blower 24 operates continuously, and air passes continuously through all of the discharge openings 23. When localized heating of the calender roll is desired, the heating elements in the area to be heated are energized to heat the air passing through the openings in that area. The air discharged through the openings impinges upon the surface of the roll, and bounces repeatedly back and forth between the surfaces of the faceplate and the roll as indicated by arrows 36 in FIG. 2. The high velocity air impinging upon the surface of the roll breaks up the boundary layer of air near the surface which otherwise might prevent the transfer of heat to the roll. Baffle bars 28 or equivalent ribs formed by a corrugated surface maintain the air between the faceplate and the roll in a turbulent condition, and this turbulence provides better heat transfer and better control of the roll temperature. In addition to the impingement heating provided by the air impinging upon the roll and the convective heat transfer provided by the circulation of the turbulent air between the faceplate and the roll, the faceplate is heated by the heating elements behind the faceplate and by the circulating hot air in front of the faceplate, and additional heating of the roll is provided by radiation from the front face of the faceplate. This combination of impingement, convective and radiant heating provides a readily controlled and highly efficient localized heating of the calender roll.

Localized cooling of the calender roll is provided by unheated air passing through discharge openings where the heating elements are not energized. The heating elements can locally heat the calender roll to temperatures as high as 50° F. above the normal operating temperature. The unheated air at room temperature passing through the discharge openings can cool the roll to temperatures up to 10° F. below the normal operating temperature of the roll (e.g. normal operating temperatures range from 80° to 200° F.). With some calendar rolls that run at 350° F., the roll can be cooled 50° F. or heated 10° F. With this system, only one source of air is required, and that source can be the air in the room where the system is employed.

The invention has a number of important features and advantages. It utilizes a single air source at room temperature, and at this temperature no insulation of the plenum chamber is required. The air discharging simultaneously and continuously from all of the discharge openings prevents the air from spreading sideways to that the local heating or cooling effect is concentrated in the area desired. And such heating or cooling effect is obtained by varying the temperature of the air compared to prior systems intermittently blowing hot or cold air from nozzles. The heating elements are positioned just behind the faceplate where they heat the front surface of the plate as well as the air passing through the openings. The high velocity air breaks the boundary layer surrounding the roll and is then trapped between the roll and the faceplate. The air is forced to be turbulent by the baffle bars, and this turbulence allows heat to be rapidly conveyed from the front surface of the faceplate to the roll. The rough front surface provided by the baffle bars increases the efficiency of heat transfer from the faceplate, and the two rows of discharge openings maintain the turbulence and boundary layer destruction.

Figure 4:
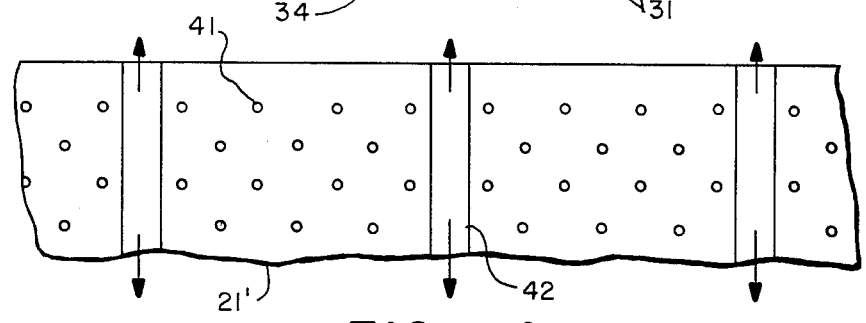
FIG. 4 is a fragmentary front elevational view of an alternate embodiment of an actuator.
Figure 5:
FIG. 5 is a simplified side view of FIG. 4.

The embodiment of FIGS. 4 and 5 illustrate an alternative type of discharge opening. Here the modifed faceplate 21' has as discharge openings a plurality of circular apertures 41 which are arranged in several circumferentially spaced axially extending rows. This is all with respect to the axis of rotation of the calender roll 13 as shown in FIG. 2. Spaced behind the faceplate 21' in the same manner as shown in FIG. 2 are vertical heating elements 31. This is as best shown in FIG. 3. As shown there, there are a pair of heating elements for each zone which is approximately three inches as measured in an axial direction. These zones are, of course, individually controlled by the associated control apparatus 18 as shown in FIG. 1. To enhance heating, an additional pair of heating elements 31 may also be installed in each zone to provide an even greater temperature differential. As much as 2.5 kilowatts of power can be applied to a three inch axial zone. The greater the temperature differential the greater the heat transfer efficiency, of course.

Another enhancement of the invention is illustrated where the faceplate 21' may also include a plurality of circumferential grooves 42. These extend substantially between the top and bottom edge of the faceplate and are actually spaced along it substantially the entire axial length. FIG. 5 illustrates such grooves in cross-section. The advantage here is that after the air has performed its heating or cooling function it is easily exhausted from the region between the faceplate 21' and the roll 13 by means of these circumferential grooves which in effect form low pressure channels for exhausting the air to the ambient.

From a practical point of view, the apertures 41 are of as small a diameter as possible commensurate with the type of metal being used for faceplate 21, in order to provide a dense hole pattern. For example, for stainless steel, a diameter of five sixty-fourths of an inch has been found suitable. Then with regard to this type of diameter, the percent opening should range from 0.8% to 2.5%. This dense hole pattern provides a dense jet impingement region for increase of heat transfer efficiency. Finally, heat transfer efficiency is enhanced because the several rows of holes on the faceplate which makes perhaps a 25° angle circumferentially along the roll provides a large area of contact; this is relative to, for example, a single line of air nozzles.

Figure 6:
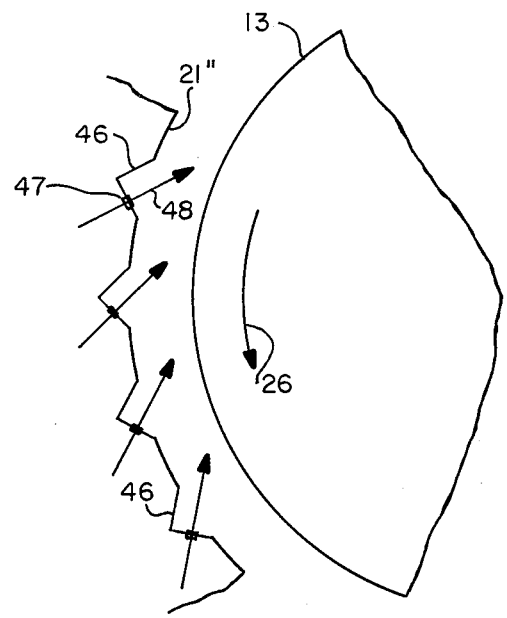
FIG. 6 is a cross-sectional view, somewhat schematic of another alternative embodiment of an actuator.

FIG. 6 which is modeled after FIG. 2 shows a alternate embodiment of the faceplate where the faceplate 21" includes an axial set of V-shaped grooves 46 in the faceplate which include circular apertures 47 to provide a jet of air in the direction as indicated as 48. This corrugated or grooved or V-shaped surface is believed to improve the impingement effect and, thus, increase heat transfer efficiency. In addition, the velocity vector 48 of the air jet has a component of velocity opposite direction 26 in which roll 13 is rotating. This increases relative velocity arriving at roll surface to therefore promote heat transfer efficiency.

Thus, to summarize the advantages of the present invention, rather than the use of separate sources of hot or cold air, the present invention utilizes only a single air source, viz, room air at room temperature. This air can be used at room temperature because of the higher thermal or heat transfer efficiency of the present unit. This is accomplished by the following three factors which have been discussed above:

(1) The actuator of the present invention partially wraps the calender roll to increase the heat transfer area many times compared to air nozzles.

(2) Turbulence is enhanced by the alternative designs of the faceplate and the use of multiple air jets, both of which increases heat transfer efficiency. This allows a very low volume of air, for example, 75 cfm per foot width (420 cubic meters per hour per meter width) to transfer a large amount of heat.

(3) The temperature difference ($\Delta T$) can be very high primarily due to the location of the heating elements in close proximity to the faceplate which contains the discharge openings. In conventional hot/cold air systems, chillers are used off of the machine and then the hot and chilled air is piped along insulated plenums. Energy loss or gain during transport imposes limits on the air temperature.

Because of the use of the room temperature air, this means that the air can be on continuously. Thus, normally exposed surfaces are bathed in the room temperature air absent the selected heating. This allows the unit to be compact and the air temperature to be high when needed. And in spite of all the exposed surfaces, air temperatures are below the ignition point of paper.

Finally, the fact that the air is on continuously and only the temperature is varied means, as discussed above, that the air from each zone which is being heated is prevented from spreading by the air exiting also from adjacent zones. This effectively confines the heating air to one zone. Thus, a new and improved caliper control system and method have been provided.

What is claimed is:

1. In a system for treating a web of material: a rotating calender roll which presses against the web and varies in diameter with changes in temperature, an axially elongated cylindrical curved faceplate positioned coaxially of the roll with the front surface of the faceplate in close facing proxmity to the outer surface of the roll, a plurality of discharge openings spaced axially along the faceplate, plenum means in fluid communication with the discharge openings, and including said faceplate as a portion thereof, blower means for delivering room temperature air under pressure to said plenum means, a sensor for monitoring the caliper of the web after it is pressed by the roll, and means responsive to the sensor for selectively controlling along a plurality of axial zones the temperature of the air passing through the discharge openings to selectively heat or cool portions of the roll to control the caliper of the web including a plurality of individually controlled electrical heating elements associated with respective zones positioned behind the faceplate for selectively heating the air passing throgh proximate discharge openings to provide air in adjacent zones having a significant temperature differential.

2. The system of claim 1 wherein said blower means provides a continuous flow of said room temperature air along all of said zones whereby selectively heated air is confined to one said zone.

3. The system of claim 1 wherein the discharge openings comprise elongated slotted openings oriented with their long dimensions generally parallel to the axis of the roll.

4. The system of claim 1 including a plurality of axially extending baffle bars projecting from the outer surface of the faceplate.

5. The system of claim 1 wherein the discharge openings are oriented to direct the air into the region between the faceplate and the roll with a component of velocity in the direction in which the surface of the rotating roll travels past the discharge openings.

6. In a system for treating a web of material: a rotating roll which presses against the web and varies in diameter with changes in temperature, an axially elongated cylindrically curved faceplate positioned coaxially of the roll with the front surface of the faceplate in close proximity to the outer surface of the roll, a plurality of discharge openings arranged in two circumferentially spaced axially extending rows, one of said rows being positioned near one edge of the faceplate and the other of said rows being positioned centrally between the edges of the faceplate, means for delivering air through the discharge openings at high velocity into the region between the faceplate and the roll, a sensor for monitoring the caliper of the web after it is pressed by the roll, and means responsive to the sensor for controlling the temperature of the air passing through the discharge openings to selectively heat or cool portions of the roll to control the caliper of the web including a plurality of individually controlled heating elements positioned behind the faceplate for selectively heating the air passing through different discharge openings.

7. In a system for treating a web of material: a rotating roll which presses against the web and varies in diameter with changes in temperature, an axially elongated cylindrically curved faceplate positioned coaxially of the roll with the front surface of the faceplate in close facing proximity to the outer surface of the roll, a plurality of discharge openings comprising a plurality of circular apertures arranged in a plurality of circumferentially spaced axially extending rows along the faceplate, said faceplate including a plurality of circumferential grooves extending substantially between edges of the faceplate and axially-spaced along the faceplate, means for delivering air through the discharge openings at high velocity into the region between the faceplate and the roll, a sensor for monitoring the caliper of web after it is pressed by the roll, and means responsive to the sensor for controlling the temperature of the air passing through the discharge openings to selectively heat or cool portions of the roll to control the caliper of the web including a plurality of individually controlled heating elements positioned behind the faceplate for selectively heating the air passing through different discharge openings.

8. The system of claim 1 wherein said faceplate includes a plurality of axial V-shaped grooves in which said discharge openings are placed.

9. The system as in claim 8 wherein said discharge openings are oriented to direct the air into the region between the faceplate and the roll with a component of velocity opposite the direction in which the surface of the rotating roll travels past the discharge openings.

10. In a method of treating a web of material with a rotating calender pressure roll which varies in diameter with changes in temperature where such diameter is varied by directing air at said roll through a plurality of axially spaced openings, arranged along a plurality of zones in the axial direction in an axially elongated cylindrically curved face plate in close facing proximity to the surface of the roll and where electrical heating elements are positioned behind said faceplate in each of said zones the steps of:
providing from a single source at room temperature a continuous flow of air through said openings into the region between said faceplate and the roll; and
selectively heating in a region proximate to said faceplate by activation of said heating elements said room temperature air before it exits through the proximate opening to provide air in adjacent zones having a significant temperature differential, said continuous flow of air exiting from adjacent zones preventing spreading to confine said heated air to one said zone.

11. A method as in claim 10 where said continuous air flow baths the surface of said faceplate in room temperature air absent said selective heating.

12. A method of claim 10 including the additional steps of monitoring the caliper of the web and controlling the heating of the air to adjust the diameter of the roll to produce a desired caliper.

13. The method of claim 10 wherein the air is directed through the openings at high velocity and in a direction such that the air bounces back and forth between the surfaces of the faceplate and the roll as it passes through the region between the faceplate and the roll.

14. The method of claim 10 wherein the air is maintained in a turbulent condition between the faceplate and the roll.

15. The method of claim 10 wherein air at room temperature is introduced under pressure into a plenum chamber in communication with the discharge openings.

16. A method as in claim 10 including the step of providing a plurality of axially spaced low pressure circumferential channels for exhausting air from the region between the faceplate and the roll.

17. A method as in claim 10 including the step of corrugating said faceplate to alter air flow direction for increasing relative arriving velocity to the roll surface.

* * * * *